United States Patent
Da Silva Neto

(10) Patent No.: US 7,706,897 B2
(45) Date of Patent: Apr. 27, 2010

(54) FUNCTIONAL BLOCK FOR FIELD DEVICES USED IN PROCESS AUTOMATION TECHNOLOGY

(75) Inventor: Eugenio Ferreira Da Silva Neto, Biel-Benken (CH)

(73) Assignee: Endress + Hauser Process Solutions AG, Reinach (CH)

( * ) Notice: Subject to any disclaimer, the term of this patent is extended or adjusted under 35 U.S.C. 154(b) by 610 days.

(21) Appl. No.: 10/573,660

(22) PCT Filed: Oct. 6, 2004

(86) PCT No.: PCT/EP2004/011148

§ 371 (c)(1), (2), (4) Date: Jan. 16, 2007

(87) PCT Pub. No.: WO2005/036284

PCT Pub. Date: Apr. 21, 2005

(65) Prior Publication Data

US 2007/0213846 A1 Sep. 13, 2007

(30) Foreign Application Priority Data

Oct. 7, 2003 (DE) ................. 103 47 007

(51) Int. Cl.
G05B 19/42 (2006.01)
(52) U.S. Cl. .................. 700/19; 700/96; 709/224
(58) Field of Classification Search .............. 700/10, 700/19, 30, 89, 96; 702/179, 182; 707/203, 707/E17.116, E17.121
See application file for complete search history.

(56) References Cited

U.S. PATENT DOCUMENTS

| 7,020,532 B2* | 3/2006 | Johnson et al. ............... 700/89 |
| 7,171,281 B2* | 1/2007 | Weber et al. .................. 700/96 |
| 2007/0142926 A1* | 6/2007 | Hopsecger ................... 700/10 |
| 2007/0213846 A1* | 9/2007 | Da Silva Neto ............... 700/19 |
| 2008/0027678 A1* | 1/2008 | Miller .......................... 702/182 |
| 2008/0082294 A1* | 4/2008 | Pihlaja et al. ................ 702/179 |
| 2008/0125879 A1* | 5/2008 | Miller .......................... 700/30 |

FOREIGN PATENT DOCUMENTS

| DE | 195 02 499 A1 | 8/1996 |
| DE | 103 09 886 A1 | 9/2003 |
| EP | 0 450 829 A1 | 10/1991 |

(Continued)

OTHER PUBLICATIONS

Muskinja N. et al., "Use of TCP/IP Protocol in Industrial Environment", Industrial Technology, 2003 IEEE International Conference on Maribor, Slovenia, Dec. 10-12, 2003.

(Continued)

*Primary Examiner*—Ramesh B Patel
*Assistant Examiner*—Douglas S Lee
(74) *Attorney, Agent, or Firm*—Bacon & Thomas, PLLC

(57) ABSTRACT

A function block for field devices of process automation technology. The function block can be loaded into a component of a field device and is linkable with other function blocks (e.g., PID, AI, AO). The function block includes a web-server which makes information available in a general descriptive language (e.g., HTML).

5 Claims, 2 Drawing Sheets

FOREIGN PATENT DOCUMENTS

WO          WO 97/39393          10/1997

OTHER PUBLICATIONS

Samson AG/V74 Schulung: "Foundation Fieldbus", Jun. 22, 2003, XP002331534, Frankfurt, Germany.

Pee Suat Hoon, et al., "Foundation™ Fieldbus High Speed Ethernet (HSE) Implementation", Proceedings of the 2002 IEEE International Symposium on Intelligent Control, Canada, 2002.

Fieldbus Foundation: "Fieldbus Facts Online", Fieldbus Facts Archive, Bd. 2, Nr. 9, Sep. 2001, XP 002331533.

* cited by examiner

FUNCTIONAL BLOCK FOR FIELD DEVICES USED IN PROCESS AUTOMATION TECHNOLOGY

FIELD OF THE INVENTION

The invention relates to a function block for field devices of process automation technology.

BACKGROUND OF THE INVENTION

In process automation technology, field devices are often used which serve for registering and/or influencing process variables. Examples of such field devices are fill level meters, mass flow measuring devices, pressure and temperature measuring devices, etc., which as sensors register the corresponding process variables, fill level, flow, pressure, and temperature.

Serving for the influencing of process variables are the so called actuators, e.g., valves which change the flow of a liquid in a section of pipeline, or pumps which change the fill level in a container.

A large number of such field devices are manufactured and sold by the firm Endress+Hauser.

As a rule, field devices in modern fabrication plants are connected via a fieldbus (Profibus®, Foundation® Fieldbus, etc.) with control systems or units. These serve for process control, process visualization, process monitoring, as well as for configuring and parametering of the field devices. Field devices execute various functions within the process control. For special standard functions, e.g., PID-controller, so-called function blocks with defined communication interfaces are available. These function blocks represent, on the basis of corresponding algorithms which are executed in the microprocessors of the individual field devices, special application functions. Field devices with microprocessors are also referred to as intelligent field devices or smart field devices.

An essential aspect of the function blocks is that they have defined interfaces and, therefore, can be easily interconnected for complex control strategies.

In the Foundation® Fieldbus specifications, which are publicly available, various standard function blocks are specified. Typical function blocks for field devices are "Analog Input" AI, "Analog Output" AO, "Discrete Input" DI, "Discrete Output" DO, "PID-control" PID. Besides these basic function blocks, there are also special function blocks "Analog Alarm," "Arithmetic," "Device Control." Recently, also flexible function blocks of the Foundation® Fieldbus are specified, which are freely programmable according to the IEC Standard 61131 (e.g., Supervisory Data Acquisition). In the IEC Standard 61158 are specified, besides different fieldbus systems, also the Foundation® Fieldbus technology.

Before a field device can be introduced in a process environment, it must be configured and parametered. For this, among other things, the loading of the control strategy into the corresponding field devices is necessary. A known application which makes this possible is the system SYSCON (of the firm SMAR). With this application, also the concrete interconnection of the individual function blocks, as well as the chronological course of the control strategy can be tested.

For changing the parameters of a function block, first this function block must be called up within a corresponding operating program. Thereupon, the parameters of this function block displayed in the operating program can be changed by the user. If a plurality of parameters of a control loop, e.g., a cascade control, must be changed, then the corresponding individual function blocks must be sequentially found within the operating program, called up, and the necessary parameter changes effected. This is very complicated and time consuming for the user. The user must also, in order to get certain information of a plurality of function blocks, in each case, call-up the corresponding function blocks separately, in a complicated manner, to have them then be displayed on the user interface of the operating program.

SUMMARY OF THE INVENTION

An object of the present invention is to provide function blocks for field devices of process automation technology, which function blocks enable a simple presentation of information from separate function blocks.

This object is achieved by a function block for field devices of process automation technology, such function block including a web server which makes information available in a general descriptive language (for example. HTML).

An essential idea of the invention is, therefore, to integrate a web-server into a function block for field devices of process automation technology and to link this function block with other function blocks. In this way, information of various function blocks can be displayed in a web browser (e.g., Netscape Navigator, Internet Explorer) and when necessary the information can be changed from this browser.

In an embodiment of the invention, the function blocks are formed according to the Foundation® Fieldbus standard.

In a further embodiment of the invention, the function blocks are formed according to the Profibus® standard.

In a special embodiment of the invention, the function block is located in a field device or in a controller.

Besides configuration information, diagnosis information can also be fetched via the web-browser function block.

BRIEF DESCRIPTION OF THE DRAWINGS

The invention will now be explained in greater detail on the basis of an example of an embodiment shown in the drawing, the figures of which show as follows.

DESCRIPTION OF THE PREFERRED EMBODIMENTS

Figure 1:
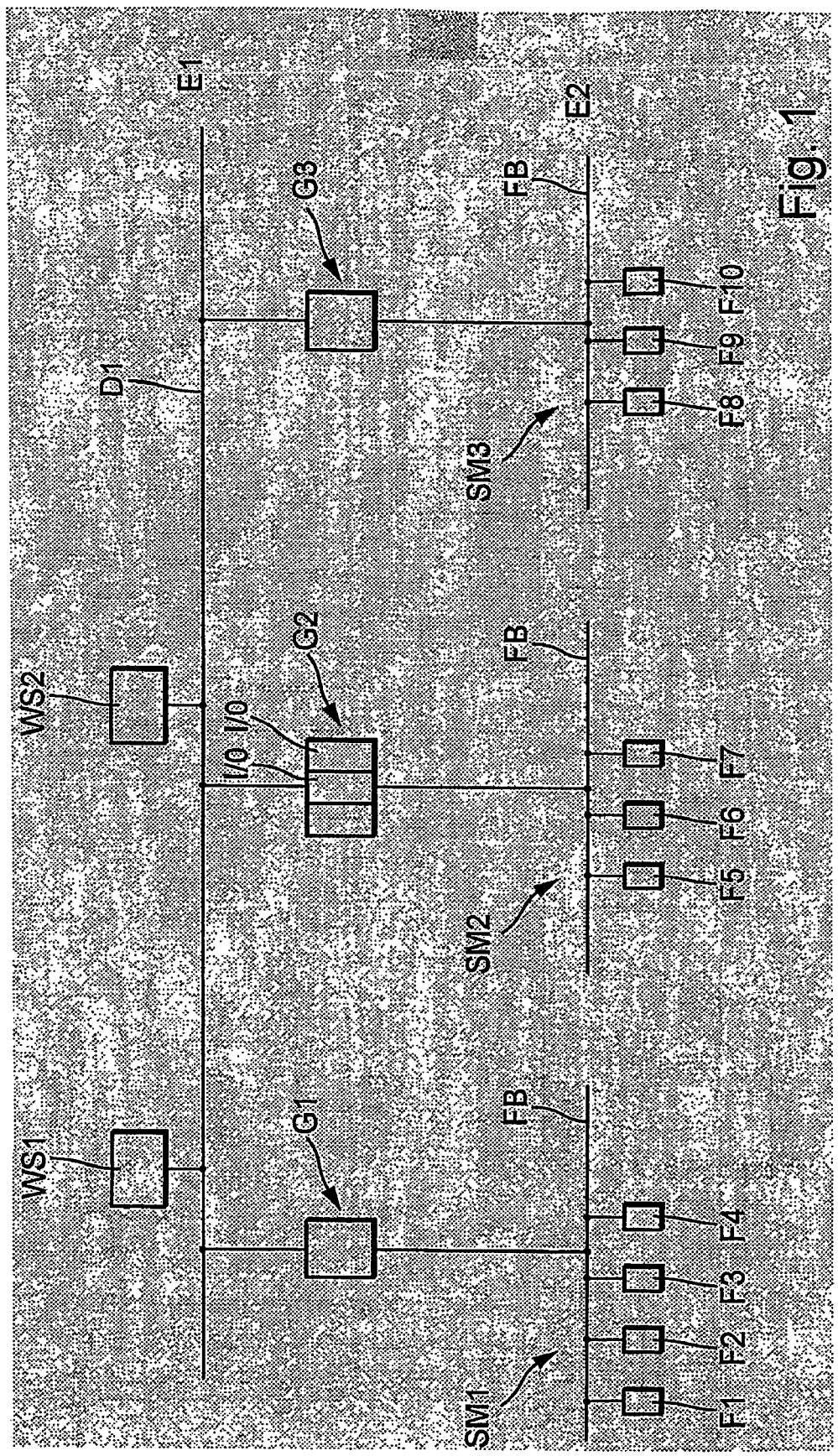
FIG. 1 is a network for process automation technology, in schematic presentation.

FIG. 1 shows in a greater detail a network of the process automation technology. To a data bus D1 are connected a plurality of control systems or units (workstations) WS1, WS2, which serve for process visualization, process monitoring, and for engineering. Data bus D1 works, e.g., according to the HSE (High Speed Internet) standard of Foundation® Fieldbus. Via a gateway G1, also referred to as a linking device, data bus D1 is connected with a fieldbus segment SM1. Gateway G1 can be a controller.

Fieldbus segment SM1 is composed of a plurality of field devices F1, F2, F3, F4, which are connected together via a fieldbus FB1. Besides the fieldbus segment SM1, also other fieldbus segments SM2 and SM3 are connected via corresponding gateways G2, G3, with the data bus D1.

Fieldbus segment SM2 includes field devices F5, F6, F7, and field bus segment SM3 has field devices F8, F9, and F10. Each of these fieldbuses FB1, FB2, FB3 works according to the Foundation® Fieldbus standard.

Figure 2:
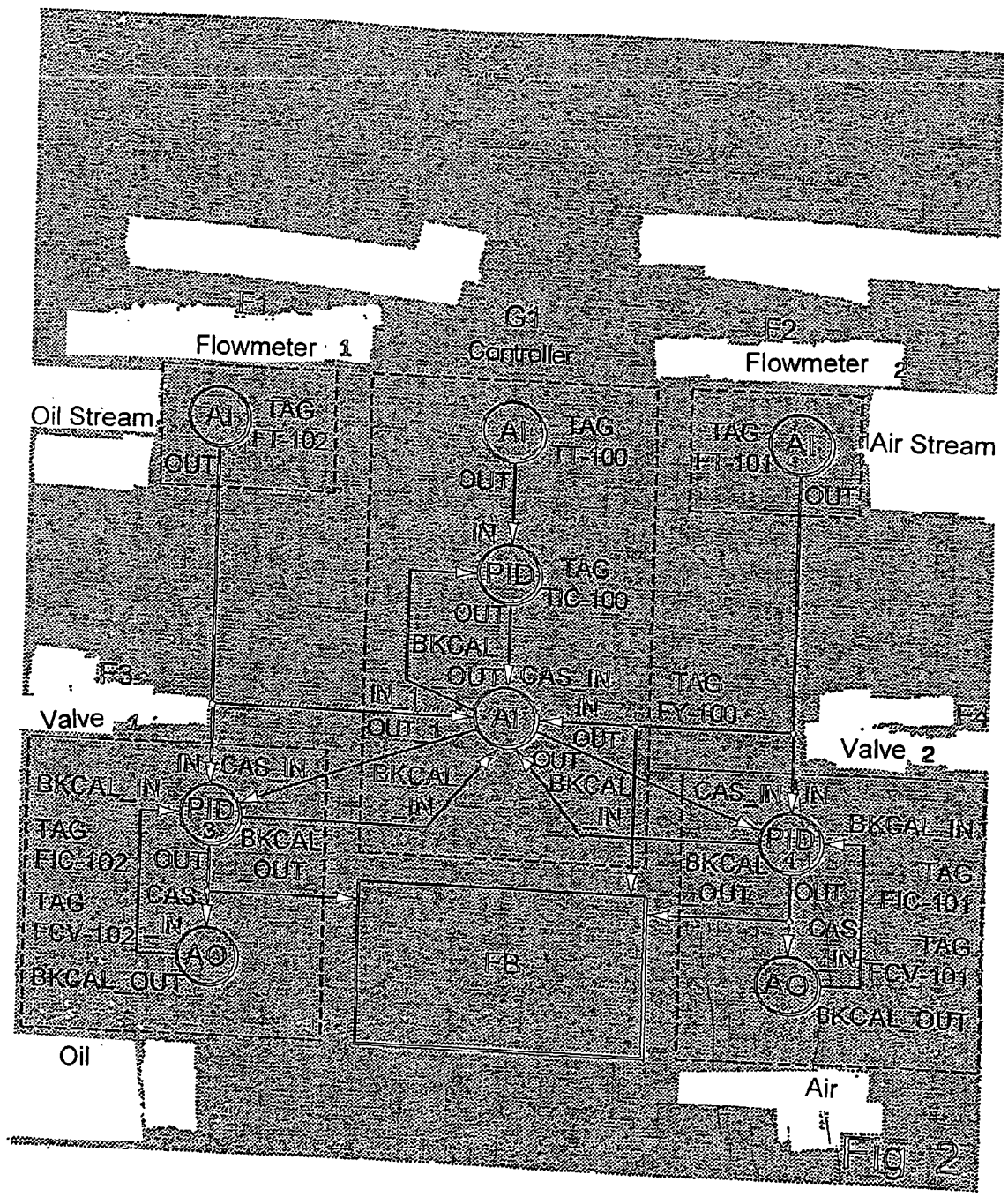
FIG. 2 is a function block for field devices of process automation technology, showing the function block linked with other function blocks.

Referring now to FIG. 2, a plurality of function blocks, AI analog input, PID PID-controller, AO analog output, and an OSDL output splitter double limit and their linkings are shown. The individual linkings will not be discussed further, since they are known to those skilled in the art. In the case of the control strategy, of concern here is the control for a combustion oven, in which the air-fuel ratio is held within specified limits. Measured and controlled here are the air flow rate and the fuel flow rate. To this end, two flow meters F1, F2, and two control valves F3, F4, are provided in each case in the corresponding feed lines for the combustion air and the fuel.

The function block OSDL is located in the controller G1. Additionally provided is a function block FB of the invention. Function block FB is connected with the function blocks PID4 and PID3, as well as with the function block OSDL5. The function block FB includes a web-server. In this way, available to the function block FB are the parameter values CAS-IN of three function blocks PID3, PID4 and OSDL5.

The manner in which the invention functions will now be explained in greater detail. With the help of a web browser, it is possible to access the function block FB from a control unit, e.g., WS1. The function block FB, which includes a web-server, makes its information available as HTML pages in a general descriptive language. The corresponding information of the other function blocks are, in this way fetchable and changeable in simple manner with the help of a web browser.

The function block FB can be also connected with further function blocks, e.g., FB2 and FB3, which, in each case, likewise have a web-server integrated in them. These linkages to other web-capable function blocks are shown in the browser as hyperlinks. By clicking these hyperlinks, the user is led in simple manner to further function blocks, whose information is then displayed in the browser window. From the browser window, it is then possible very easily to accomplish parameter changes.

The call up of information of function blocks for field devices of process automation technology is thus effected considerably more simply. Also, parameter changes can be performed essentially more simply. The user is very quickly led via hyperlinks to the corresponding information and is not required to make complex searches through tree structures for the desired information. This is of enormous importance, especially for the inexperienced user in the field of fieldbus technology. Function block FB is linkable with other function blocks in the same way that conventional function blocks are interconnectable.

When the control strategy is loaded into the field device, also the function block FB is instantiated at the predetermined location (field device or controller). If the function block FB is instantiated in a controller G1, which has an Ethernet connection, then a query can be directed from the browser directly via TCP/IP to the web-server in the function block FB. If the function block FB is, however, instantiated in a field device, then the HTTP query must be transported via the fieldbus protocol to the field device; this is also referred to as tunneling. In like manner, the answer from the web-server must also be tunneled through the fieldbus.

With the help of the web-server function blocks of the invention, it is possible, in simple manner, to access parameters of function blocks (e.g., outputs, set points, mode, etc.). The web-server function blocks of the invention can also be used for hiding the complexity of function blocks for certain users by presenting on the HTML pages only the information needed for the particular application. The user thus sees on the browser only the information important for the user.

With the help of the HTML pages, also the information of function blocks can be clearly structured by publishing configuration data and diagnosis data on separate pages.

The invention claimed is:

1. A function block for field devices of process automation technology, which includes a web-server which makes information available in a general descriptive language (e.g., HTML), said function block being loadable into a component of a fieldbus and linkable with other function blocks (e.g., PID, AI, AO), whereby a web-browser with a browser window is provided, a control unit is provided, said control unit has access to said function block via said web browser, and whereby with the help of the web browser the configuration and diagnosis information of the other function blocks which are connected to said function block are available in a general descriptive language and edited, and changeable with the help of the web browser.

2. The function block as claimed in claim 1, wherein:
said function block conforms to the Profibus® standard.

3. The function block as claimed in claim 1, wherein:
said function block conforms to the Foundation® Fieldbus standard.

4. The function block as claimed in claim 3, wherein:
said function block is embodied as a "flexible function block."

5. The function block as claimed in claim 1, wherein:
said function block is loadable into a field device or into a controller.

* * * * *